(12) United States Patent
Barron

(10) Patent No.: US 7,499,873 B2
(45) Date of Patent: Mar. 3, 2009

(54) COMMUNICATION THROUGH A FINANCIAL SERVICES NETWORK

(75) Inventor: Jack Barron, 11 Sadie Hutt La., Southboro, MA (US) 01772

(73) Assignee: Jack Barron, Southborough, MA (US)

( * ) Notice: Subject to any disclaimer, the term of this patent is extended or adjusted under 35 U.S.C. 154(b) by 901 days.

(21) Appl. No.: 10/993,198

(22) Filed: Nov. 19, 2004

(65) Prior Publication Data
US 2005/0210240 A1   Sep. 22, 2005

Related U.S. Application Data

(63) Continuation-in-part of application No. 10/803,844, filed on Mar. 18, 2004.

(51) Int. Cl.
G06Q 40/00   (2006.01)

(52) U.S. Cl. .............................. 705/14; 705/40; 705/41; 705/42; 705/43

(58) Field of Classification Search ............. 705/35–40; 283/57–59
See application file for complete search history.

(56) References Cited

U.S. PATENT DOCUMENTS

2002/0128967 A1 * 9/2002 Meyer et al. .................. 705/40
2004/0010597 A1   1/2004 Kirschner et al.
2007/0106604 A1 * 5/2007 Van Rensburg et al. ....... 705/39

OTHER PUBLICATIONS

Nelson, Stephen, Book "Quicken 2001 for Dummies" IDG Books Worldwide, 2000, IDBN: 0-7645-0759-1.*

* cited by examiner

Primary Examiner—Mary Cheung
Assistant Examiner—Kirsten S Apple
(74) Attorney, Agent, or Firm—Lowrie, Lando & Anastasi, LLP

(57) ABSTRACT

A method of communicating a message from a sender to a recipient in possession of a unique identifier by use of which the recipient can perform a transaction at a transaction terminal includes: receiving the message from the sender, the message including a reference to the unique identifier; storing the message in a computer memory; detecting performance by the recipient of a transaction at the transaction terminal; and transmitting the message from the computer memory in which it is stored to the transaction terminal for display to the recipient incidental to the transaction performed, the message being independent of the transaction performed. Apparatus for communicating a message from a sender to a recipient in possession of a unique identifier by use of which the recipient can perform a transaction at a transaction terminal comprises: a first communication network; a second communication network including a transaction terminal; a computer memory; one or more processors collectively executing a sequence of instructions defining functions of receiving the message over the first communication network; storing the message in the memory; detecting performance by the recipient of a transaction at the transaction terminal; and transmitting the message over the second communication network. The recipient may be selected from a target list of recipients identified with a sponsor, wherein the message includes a reference to the target list.

24 Claims, 5 Drawing Sheets

COMMUNICATION THROUGH A FINANCIAL SERVICES NETWORK

BACKGROUND

The present invention relates to methods and apparatus for communicating messages from a sender to a recipient. More particularly, the invention relates to methods and apparatus for communicating with a recipient having access to a transaction terminal, such as a point of sale (POS) terminal or automatic teller machine (ATM) terminal.

Modern technological communication methods and apparatus employ many different types of networks. For example, telephone users, including cellular telephone users, communicate over the public switched telephone network (PSTN). A calling party need only know the phone number of the called party in order to establish a connection. If direct communication cannot be established, for example when a called party is not present at the location of the telephone at which they have been called, or when a called party is using a cell phone, but is out of range, voicemail takes over. The calling party can leave a message for the called party to pick up when convenient. But, even when using a cell phone, the called party is only alerted to the presence of a message when in range. Moreover, in order for the called party to receive the message, they must initiate an access of their voicemail system. This is inconvenient or impossible in some locales.

Another type of network used for communication is the world-wide Internet network of computers. The Internet is enabling technology for, among other things, email and instant messaging (IMing). With email, if a sender knows the email address of a recipient, a message can be sent that is stored in the recipient's email inbox until it becomes convenient for the recipient to retrieve and read. IMing works a bit more like a phone call, in that a two-way link can be established by the sending party, by simply sending an initial message to the address of the recipient. Some IM systems allow for a sort of stored and forwarded message, like voicemail, for absent recipients, while others do not. In a conventional IM system each sender and recipient communicates through a specialized server.

Some common features of all of the systems described above include that the systems utilize a publicly accessible network, and significantly, that the sender and recipient each have access to an addressable communications device.

Another type of ubiquitously available communication system is the transaction processing network. Each credit or debit card clearing company, such as Master Card International and Visa International, has constructed and established such a network through which various types of financial transactions pass. These networks are tailored for the private, secure, transmission of financial transaction data, and are not otherwise publicly accessible. POS terminals and ATM terminals communicate financial transaction data privately and securely from the user to the user's financial institution, card issuer, etc. However, such networks do not carry private messages or provide users with addressable communications devices.

SUMMARY OF THE INVENTION

According to aspects of some embodiments of the invention, a method of communicating a message from a sender to a recipient in possession of a unique identifier by use of which the recipient can perform a transaction at a transaction terminal comprising: receiving the message from the sender, the message including a reference to the unique identifier; storing the message in a computer memory; detecting performance by the recipient of a transaction at the transaction terminal; and transmitting the message from the computer memory in which it is stored to the transaction terminal for display to the recipient incidental to the transaction performed and any message generated in response to performance of the transaction, the message being independent of the transaction performed. Numerous variations are possible. For example, the method may further comprise storing the unique identifier in a transaction token having memory therefor. The method may yet further comprise transmitting the unique identifier from the transaction terminal to a transaction processor in communication with the memory; and searching the memory for the message using the reference to unique identifier to find the message. The unique identifier may be a transaction card number. According to another alternative, the method may further comprise transmitting a limited use identifier mapped to the unique identifier from the transaction terminal to a transaction processor in communication with the memory; determining, by a reverse mapping, the unique identifier; and searching the memory for the message using the unique identifier to find the message.

According to other aspects of some embodiments of the invention, a computer-implemented method of enhancing financial transaction services comprises providing a computer network including a transaction terminal through which financial transactions are communicated; communicating a message from a sender to a recipient through the computer network, wherein the message is transmitted to the recipient through the transaction terminal incidental to performance by the recipient of the financial transaction and any message generated in response to performance of the financial transaction.

According to yet other aspects of some embodiments of the invention, a method of communicating a message from a sender to a recipient in possession of a unique identifier by use of which the recipient can perform a transaction at a transaction terminal receiving the message from the sender, the message including a reference to the unique identifier; storing the message in a computer memory; detecting performance by the recipient of a transaction at the transaction terminal; and transmitting the message from the computer memory in which it is stored to the transaction terminal for display to the recipient incidental to the transaction performed, the message being independent of the transaction performed. In a variation, the method further comprises storing the unique identifier in a transaction token having memory therefore. The method may yet further comprise transmitting the unique identifier from the transaction terminal to a transaction processor in communication with the memory; and searching the memory for the message using the reference to unique identifier to find the message. The unique identifier may be a transaction card number. The method may yet further comprise transmitting a limited use identifier mapped to the unique identifier from the transaction terminal to a transaction processor in communication with the memory; determining, by a reverse mapping, the unique identifier; and searching the memory for the message using the unique identifier to find the message.

Apparatus for communicating a message from a sender to recipient in possession of a unique identifier by use of which the recipient can perform a transaction at a transaction terminal comprises: a first communication network; a second communication network including a transaction terminal; a computer memory; one or more processors collectively executing a sequence of instructions defining functions of receiving the message over the first communication network; storing the message in the memory; detecting performance by the recipient of a transaction at the transaction terminal; and transmitting the message over the second communication network together with any message generated in response to performance of the financial transaction.

According to aspects of yet other embodiments of the invention, a method of communicating a message to a target list of recipients identified with a sponsor includes: issuing to each recipient on the target list of recipients a unique identifier by which the recipient can perform a transaction at a transaction terminal; associating the unique identifier with the sponsor; receiving the message, the message including a reference to the target list; storing the message in a computer memory; detecting performance, by the recipient on the target list, of a transaction at the transaction terminal; and transmitting the message from the computer memory in which it is stored to the transaction terminal for display to the recipient, incidental to the transaction performed, the message being independent of the transaction performed. The acts of the method may be repeated for each member of the target list. The message may have an expiration time, after which no further attempts to sent it will be made. The acts of the method may be initiated in connection with a marketing opportunity, particularly one relevant to the sponsor.

BRIEF DESCRIPTION OF THE DRAWINGS

In the drawings, in which like reference designations indicate like elements.

DETAILED DESCRIPTION

Figure 1:
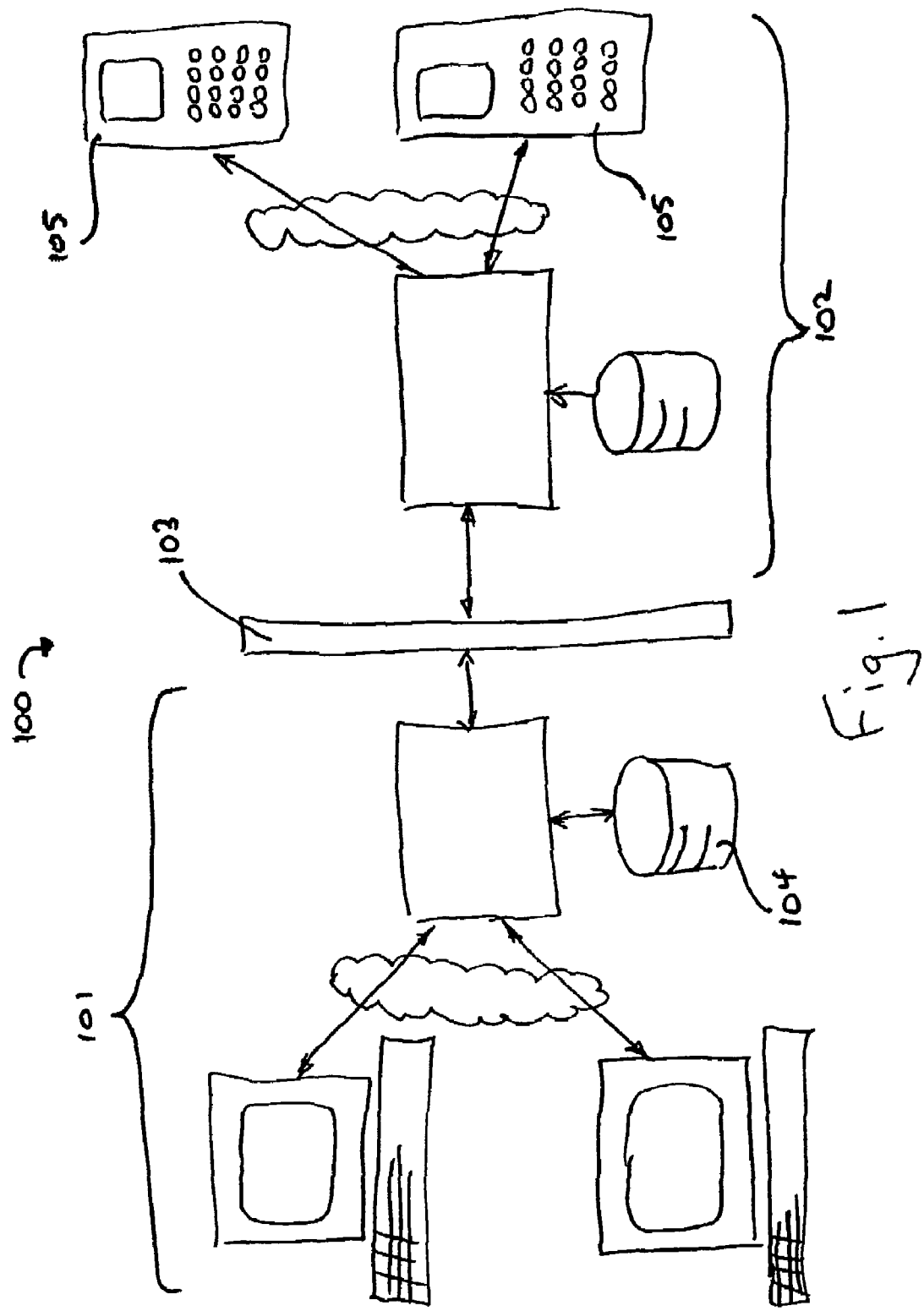
FIG. 1 is a schematic block diagram of an embodiment of aspects of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

According to embodiments of aspects of the present invention, a message can be transmitted to a traveler or other person who does not have access to a conventional landline or cellular telephone, or to an internet-connected computer or other conventional communication device. Senders input messages to a system which stores the messages and then forwards the messages to the recipients at a transaction terminal, such as a point-of-sale (POS) terminal or an automated teller machine (ATM), where the recipient attempts to perform a financial transaction using a financial transaction card or the like. Advantageously, although the invention does not guarantee delivery of a message within a particular timeframe, it does allow recipients to be reached in locations where conventional telephone, cellular phone or text messaging services do not reach, during ordinary activities in those locations.

Embodiments of the present invention may be realized in methods and apparatus that permit a sender to communicate with a recipient, for example by storing a message and later forwarding the message to the recipient when the recipient uses a transaction terminal. In at least some embodiments, the methods and apparatus may rely on networks of computer equipment deployed for the performance of financial transactions, including those initiated by a credit card or a debit card, or another token identified with a credit card number or debit card number. The recipient interface with the equipment may be, for example, a point-of-sale (POS) terminal or automatic teller machine (ATM) terminal. The methods and apparatus further include a sender interface having one or more systems for gathering the information needed to store and forward a message from a sender to a recipient. The information gathered may include the message itself, as well as addressing information by which the recipient is identified.

For purposes of illustration, without limiting the invention to the particular example described, it is assumed that the recipient possesses a credit card, or the like, having a unique identifier whereby the recipient ordinarily identifies an account through which a transaction is to be processed. The unique identifier may identify the recipient, which information is then used to identify an account which is the subject of a transaction, or may directly identify the account which is the subject of a transaction. The term "credit card," as used herein should be understood to include any such card or token having a unique identifier whereby the recipient ordinarily identifies an account through which a transaction is to be processed. Thus, "credit card" includes, but is not limited to both credit and debit cards, as well as other account identification tokens such as the Speedpass™ radio frequency identification (RFID) device (available from Exxon-Mobil Corporation) and devices which generate single-use unique identifiers using encryption, synchronous code generation or other suitable security techniques.

Although, as mentioned above, a unique identifier identifies an account through which, or with which, a card holder desires to process a transaction, it may also be used to locate the card holder when the card holder requests a transaction. Law enforcement agencies sometimes use this ability to track fugitive or missing persons, based on the places where their financial transactions are initiated. Because unique identifiers are sometimes unique to an account, but not unique to a person, plural card holders having access to the same account may be indistinguishable in this way, unless each card holder is issued their own unique identifier. Moreover, such activity by law enforcement necessitates subpoenaing records which are later delivered by the record-holder. Real-time tracking is not done.

According to aspects of embodiments of the invention, any card holder who may at some time wish to receive messages, i.e. a potential recipient, should preferably have their own unique identifier associated with a credit card, referred to as an enabled credit card, for at least one account. The unique identifier could be shared by plural users of a single account, such as when husband and wife share a credit card account, but some loss of definition of a target message recipient may result. A sender who knows a potential recipient, and who possesses sufficient identifying information about the potential recipient can, using aspects of embodiments of the invention, direct a message to the potential recipient (now, simply a recipient). The sender need not know the recipient's unique identifier, but rather any suitable set of identifying information may be used, e.g., full name and postal code, or an e-mail address. The next time the recipient performs a transaction at a transaction terminal using their enabled credit card, the message will be delivered to the recipient by being displayed on the transaction terminal and/or printed on a transaction receipt. As explained below, alternatively a message directing the recipient how to retrieve the message may be displayed and/or printed.

According to aspects of embodiments of the invention, recipients can be grouped into distribution lists, bulk mailing lists, interest groups and the like that constitute defined subsets of all of the enabled credit card holders of a particular issuer. Under such aspects, a common message can be sent to each member of such a list or group upon the next use of their enabled credit cards. Messages can also be assigned expiration times after which they will no longer be delivered, or can be made retractable, by any suitable means, such as are available using some commercial e-mail systems.

The foregoing aspects may be better understood upon consideration of a brief example.

Specialty credit cards are available, for example, associated with or sponsored by a particular sporting team, entertainer or group, product, manufacturer or service provider. A single issuer, for example a bank, may issue several different specialty cards, such as for supporters of several different sporting teams. Using aspects of embodiments of the invention, the entity sponsoring a specialty card may send a message to a distribution list including all holders of their specialty card, while excluding holders of some other specialty card. For example, when tickets to a sporting event, concert, product upgrades, new products or new services become available, a promotional message can be sent to all specialty card holders whose specialty card identifies an interest in the event, product or service affected. In this way, when a marketing opportunity presents itself, communication of a message targeted to a distribution list of interested specialty card holders can be commenced. Other associations between a targeted message, the entity sponsoring the specialty card, the distribution list and the nature of the interest of the specialty card holders in the message are possible.

In this example, the distribution list can be the entire list of specialty card holders of a particular sponsor or some faction thereof, all of which may be a subset of the enabled credit cards issued by a given issuer. A message is prepared and then sent, as described herein, to each member of the distribution list. No special handling of the distribution list is required because the list is broken down to individual addresses for the addressing and transmission of messages. Transmission of messages to individual recipients is described in detail, below.

According to aspects of embodiments of the invention, as shown in FIG. 1, a network 100 enabling senders to send messages to recipients includes a front end 101 and a back end 102. The front end 101 collects messages from one or more senders, while the back end 102 passes messages on to recipients through an existing transaction network, the back end 102 being the transaction network in this exemplary embodiment.

For security reasons, the front end 101 and the back end 102 can be separated by a strong firewall 103 or other suitable connection limiting device. One way the front end 101 and the back end 102 might be configured to communicate is as follows. Messages are collected by the front end 101 and stored in a memory or on a storage device 104. Periodically, the back end 102 polls the memory or storage device 104 through the firewall 103, to retrieve new messages for delivery. During such queries, a port is opened in the firewall for a reply to the query, which must be properly formatted and directed to the correct port of the firewall. No unsolicited communication initiated by the front end 101 is permitted, only responses to queries from the back end 102, ensuring that the back end 102 is secure and cannot be tampered with. To further ensure security of the system, if desired, the system can limit the permissible types or contents of messages traversing the firewall 103. For example, the back end 102 may be configured to process only simple text messages, entirely lacking formatting or other code. The messages can be encapsulated by the front end 101, transported to the transaction terminal 105 through the back end 102, and then un-encapsulated and displayed and/or printed by the transaction terminal 105. Messages are thus prevented from interacting with the financial transaction network of the back end, but are rather merely transported by the financial transaction network. Of course, any other suitable security measures can alternatively or additionally be implemented. For example, the front end 101 and back end 102 could be physically disconnected at all times, with messages being collected on physical media 104, such as computer disks, and then being moved from the front end 101 to the back end 102 by the physical transportation of the media, such as computer disks, from a computer on the front end to a computer on the back end. Such a method effectively prevents unauthorized, non-message contact with the back end 102 by an intruder that has found a way to violate the firewall 103.

Figure 2:
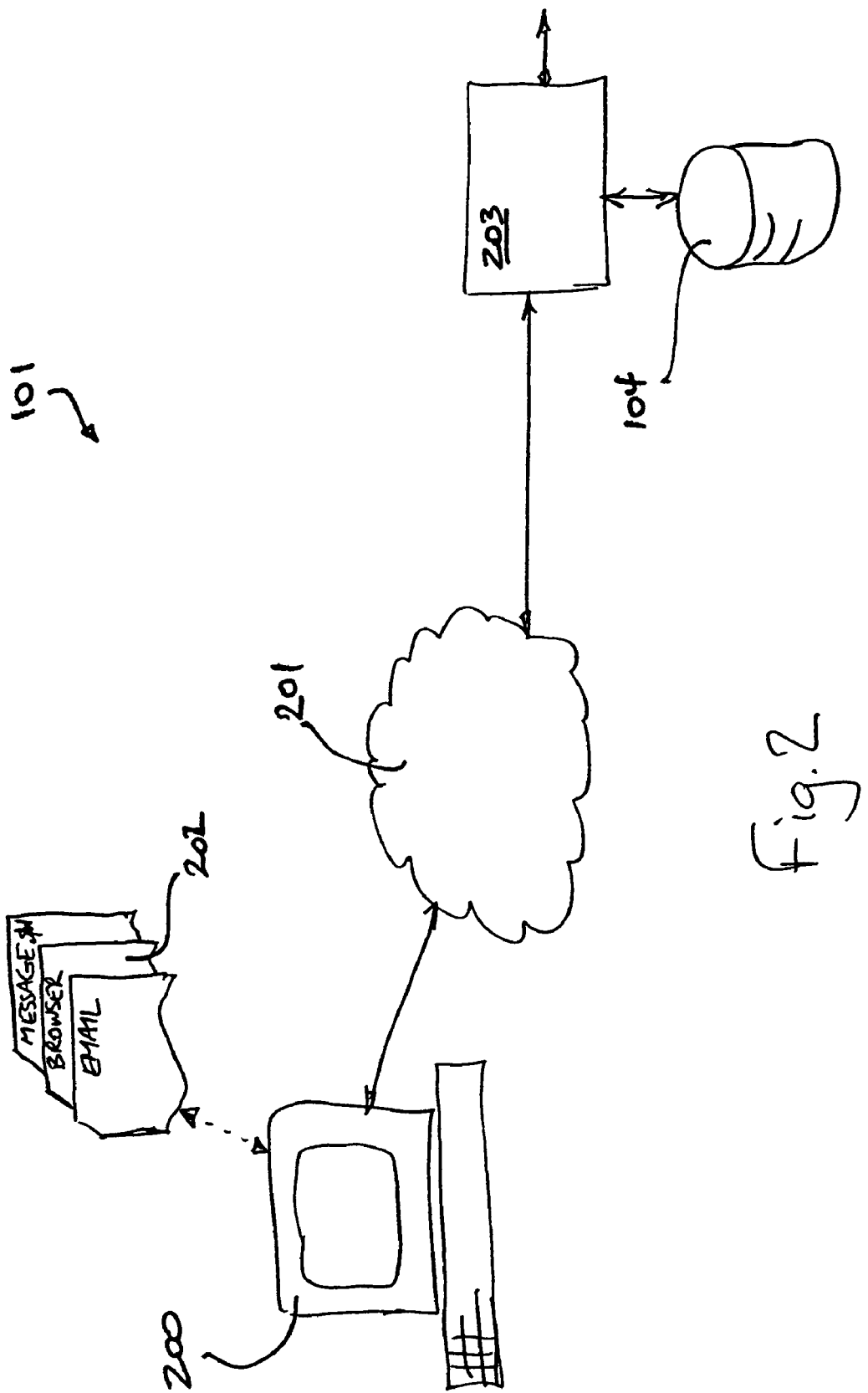
FIG. 2 is a more detailed schematic block diagram of the front end elements of the embodiment of FIG. 1.

As shown in FIG. 2, the front end 101 is a store and forward system that can be embodied in a distributed system using a general-purpose communication network 201 the Internet, for example. Senders with access to a computer terminal 200 or the like can direct their browser software 202 to a World Wide Web site on a front end system 203 at which they enter into a Web page form identifying information pertaining to the recipient to which a message is directed. Alternatively, senders can send an email to an email address at a server on a front end system 203, wherein the email address has previously been assigned to or identifies the recipient to which the message is directed. In yet another alternative, senders can send an email to a common email address serviced by an email server that parses the contents of the email message into information identifying the recipient and a message body containing the message the sender intends the recipient to receive. The email server then stores the message on a storage medium 104 for transport to the recipient through the back end network 103 at an appropriate time.

In yet another embodiment, the message itself is stored on the front end system, but not transmitted to the transaction terminal through the back end system. Rather, a message instructing the recipient to call an automated voice response (AVR) system is delivered and displayed or printed at the transaction terminal. When the recipient calls the AVR system and validates their identity to the AVR system, the AVR system then delivers the original message to the recipient, for example by "reading" it aloud using voice synthesis or by playing it back, if the message originated as an audio message. The recipient's call to the AVR system can optionally be charged back to the recipient's transaction account. Instead of an AVR system, any suitable message retrieval system can be used. The message displayed or printed can be any suitable message instructing the recipient to contact the message retrieval system.

Figure 3:
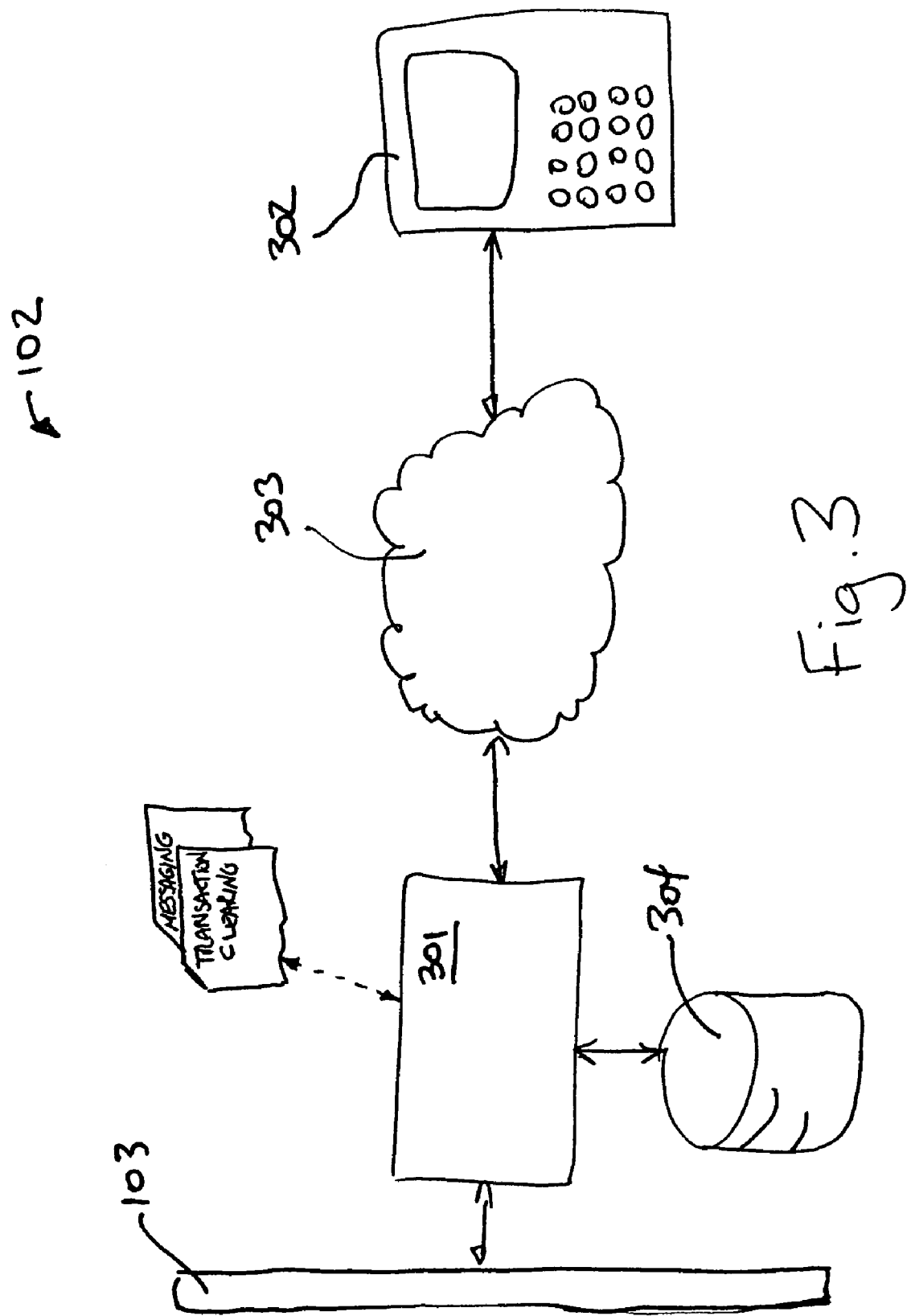
FIG. 3 is a more detailed schematic block diagram of the back end elements of the embodiments of FIG. 1.

As shown in FIG. 3, the back end 102 is a financial transaction network, for example a suitable existing or new financial transaction network. The network includes at least one financial transaction processing device 301, for example a transaction server, and at least one transaction terminal 302, connected through a communication network 303. The transaction terminal 302 may be a point of sale (POS) terminal or automatic teller machine (ATM) terminal, or any other suitable transaction terminal. When a recipient uses an enabled credit card to perform a transaction at the transaction terminal 302, a transaction message is sent from the transaction terminal to the transaction server 301 identifying the unique identifier associated with the enabled credit card. The transaction server uses the unique identifier to access associated account information which may be stored on storage device 304, and to perform the requested transaction. The transaction server 301, or optionally a special purpose device connected to the network further uses the unique identifier to retrieve any messages for the recipient by communication through the firewall 103 with the front end system 203 to match the identifying information contained in the messages to the unique identifier supplied with the transaction. Matching and identification can occur on the front end or the back end as may be convenient. As described above, the messages can then be appended to the reply by the transaction processing device to the transaction terminal 302, so that the messages can be displayed or printed on a receipt by the transaction terminal 302. Alternatively, as also described above, a message to call AVR system can be appended to the reply.

Various aspects of embodiments according to the invention may be implemented on one or more computer systems. These computer systems, including firewall 103, computer terminal 200, front end system 203, financial transaction processing device 301, and transaction terminal 302, may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to perform any of the communication or data processing tasks described according to various embodiments of the invention. Further, any part of the system may be located on a single computer or may be distributed among a plurality of computers attached by a communications network.

A general-purpose computer system may be configured to perform any of the described functions including but not limited to collecting messages, storing messages, forwarding message and displaying or printing messages. It should be appreciated that the system may perform other functions, including network communication, and the invention is not limited to having any particular function or set of functions.

Figure 4:
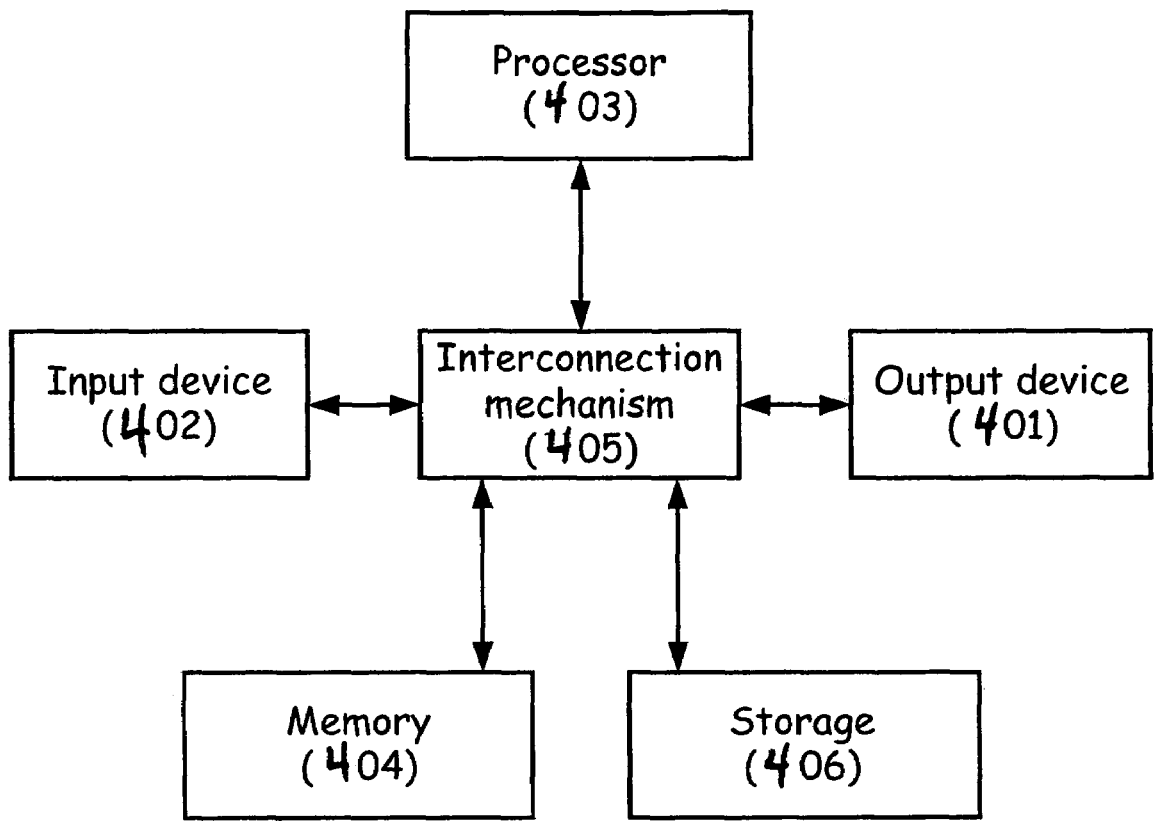
FIG. 4 is a more detailed schematic block diagram of the back end elements of the embodiments of FIG. 1.

For example, various aspects of the invention may be implemented as specialized software executing in a general-purpose computer system 400 such as that shown in FIG. 4. The computer system 400 may include a processor 403 connected to one or more memory devices 404, such as a disk drive, memory, or other device for storing data. Memory 404 is typically used for storing programs and data during operation of the computer system 400. Components of computer system 400 may be coupled by an interconnection mechanism 405, which may include one or more busses (e.g., between components that are integrated within a same machine) and/or a network (e.g., between components that reside on separate discrete machines). The interconnection mechanism 405 enables communications (e.g., data, instructions) to be exchanged between system components of system 400.

Computer system 400 also includes one or more input devices 402, for example, a keyboard, mouse, trackball, microphone, touch screen, and one or more output devices 401, for example, a printing device, display screen, speaker. In addition, computer system 400 may contain one or more interfaces (not shown) that connect computer system 400 to a communication network (in addition or as an alternative to the interconnection mechanism 405.

Figure 5:
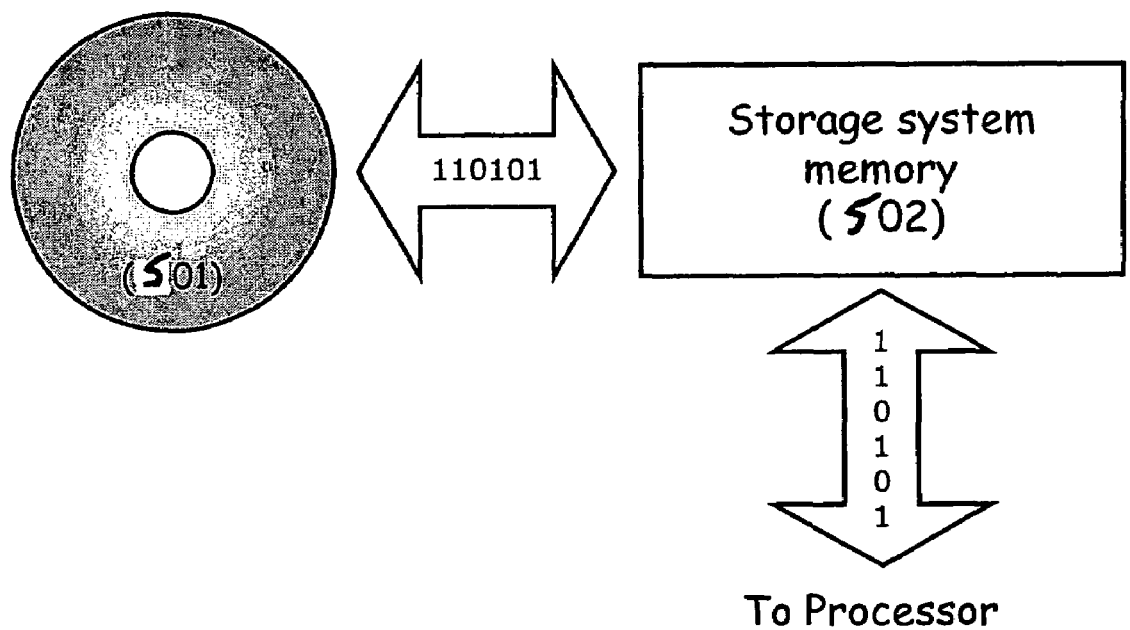
FIG. 5 is a more detailed schematic block diagram of the back end elements of the embodiments of FIG. 1.

The storage system 406, shown in greater detail in FIG. 5, typically includes a computer readable and writeable nonvolatile recording medium 501 in which signals are stored that define a program to be executed by the processor or information stored on or in the medium 501 to be processed by the program. The medium may, for example, be a disk or flash memory. Typically, in operation, the processor causes data to be read from the nonvolatile recording medium 501 into another memory 502 that allows for faster access to the information by the processor than does the medium 501. This memory 502 is typically a volatile, random access memory such as a dynamic random access memory (DRAM) or static memory (SRAM). It may be located in storage system 406, as shown, or in memory system 404, not shown. The processor 403 generally manipulates the data within the integrated circuit memory 404, 502 and then copies the data to the medium 501 after processing is completed. A variety of mechanisms are known for managing data movement between the medium 501 and the integrated circuit memory element 404, 502, and the invention is not limited thereto. The invention is not limited to a particular memory system 404 or storage system 406.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 400 is shown by way of example as one type of computer system upon which various aspects of the invention may be practiced, it should be appreciated that aspects of the invention are not limited to being implemented on the computer system as shown in FIG. 4. Various aspects of the invention may be practiced on one or more computers having a different architecture or components that that shown in FIG. 4.

Computer system 400 may be a general-purpose computer system that is programmable using a high-level computer programming language. Computer system 400 may be also implemented using specially programmed, special purpose hardware. In computer system 400, processor 403 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X operating system available from Apple Computer, the Solaris operating system available from Sun Microsystems, or UNIX operating systems available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of communicating a message from a sender to a recipient in possession of a unique identifier by use of which the recipient can perform a financial transaction at a transaction terminal, the method comprising:
   receiving the message from the sender, the message including a reference to the unique identifier;
   storing the message in a computer memory;
   performing the financial transaction at the transaction terminal, using the unique identifier;
   detecting performance of the financial transaction at the transaction terminal; and
   transmitting the message from the computer memory in which it is stored to the transaction terminal for display to the recipient at the transaction terminal, incidental to the financial transaction performed and any message generated in response to performance of the financial transaction, the message being independent of the financial transaction performed.

2. The method of claim 1, further comprising:
   storing the unique identifier in a transaction token having memory therefor.

3. The method of claim 2, further comprising:
   transmitting the unique identifier from the financial transaction terminal to a transaction processor in communication with the memory; and
   searching the memory for the message using the reference to unique identifier to find the message.

4. The method of claim 3, wherein the unique identifier is a transaction card number.

5. The method of claim 2, further comprising:
   transmitting a limited use identifier mapped to the unique identifier from the transaction terminal to a transaction processor in communication with the memory;
   determining, by a reverse mapping, the unique identifier; and
   searching the memory for the message using the unique identifier to find the message.

6. The method of claim 1, wherein receiving further comprises:
   receiving input to a computer through a browser interface.

7. The method of claim 6, wherein the reference to the unique identifier includes a name by which the recipient is known.

8. The method of claim 1, wherein the reference to the unique identifier is an e-mail address.

9. A computer-implemented method of enhancing financial transaction services, the method comprising:
   providing a computer network including a transaction terminal through which financial transactions are communicated;
   performing a financial transaction;
   communicating a message from a sender to a recipient through the computer network, wherein the message is transmitted to the recipient through the transaction terminal incidental to performance by the recipient of the financial transaction and any message generated in response to performance of the financial transaction.

10. A method of communicating a message from a sender to a recipient in possession of a unique identifier by use of which the recipient can perform a transaction at a transaction terminal, the method comprising:
    receiving the message from the sender, the message including a reference to the unique identifier;
    storing the message in a computer memory;
    detecting performance by the recipient of a transaction at the transaction terminal;
    transmitting the message from the computer memory in which it is stored to a message retrieval system accessible by dialing a telephone number; and
    transmitting the telephone number for the message retrieval system to which the message has been transmitted to the transaction terminal for display to the recipient incidental to the transaction performed and any message generated in response to the transaction performed.

11. The method of claim 10, further comprising:
    storing the unique identifier in a transaction token having memory therefor.

12. The method of claim 11, further comprising:
    transmitting the unique identifier from the transaction terminal to a transaction processor in communication with the memory; and
    searching the memory for the message using the reference to unique identifier to find the message.

13. The method of claim 12, wherein the unique identifier is a transaction card number.

14. The method of claim 11, further comprising:
    transmitting a limited use identifier mapped to the unique identifier from the transaction terminal to a transaction processor in communication with the memory;
    determining, by a reverse mapping, the unique identifier; and searching the memory for the message using the unique identifier to find the message.

15. The method of claim 10, wherein receiving further comprises:

receiving input to a computer through a browser interface.

16. The method of claim 15, wherein the reference to the unique identifier includes a name by which the recipient is known.

17. The method of claim 10, wherein the reference to the unique identifier is an e-mail address.

18. Apparatus for communicating a message from a sender to a recipient in possession of a unique identifier by use of which the recipient can perform a financial transaction at a transaction terminal, the apparatus comprising:

a first communication network;

a second communication network including a transaction terminal;

a computer memory;

one or more processors collectively executing a sequence of instructions defining functions of:

receiving the message over the first communication network;

storing the message in the memory;

detecting performance by the recipient of the financial transaction at the transaction terminal; and transmitting the message over the second communication network, the message being incidental to performance by the recipient of the financial transaction, together with any message generated in response to performance of the financial transaction.

19. The method of claim 1, further comprising:

repeatedly performing the acts of the method using a single message for a plurality of recipients all on a common distribution list.

20. A method of communicating a message to a target list of recipients identified with a sponsor, the method comprising:

issuing to each recipient on the target list of recipients a unique identifier by which a recipient on the target list can perform a transaction at a transaction terminal;

associating the unique identifier with the sponsor;

receiving the message, the message including a reference to the target list;

storing the message in a computer memory;

detecting performance, by the recipient on the target list, of a transaction at the transaction terminal; and transmitting the message from the computer memory in which it is stored to the transaction terminal for display to the recipient, incidental to the transaction performed, the message being independent of the transaction performed.

21. The method of claim 20, further comprising:

repeating the acts of detecting and transmitting the message for plural recipients on the target list.

22. The method of claim 21, further comprising:

setting an expiration time for the message; and ceasing the act of repeating upon reaching the expiration time.

23. The method of claim 20, further comprising:

initiating the method in conjunction with a marketing opportunity.

24. The method of claim 1, wherein the message directs the recipient to retrieve another message.

* * * * *